United States Patent
Nishitani

(10) Patent No.: US 11,006,050 B2
(45) Date of Patent: May 11, 2021

(54) IMAGING APPARATUS AND IMAGING METHOD USING FIRST AND SECOND IMAGES FOR GENERATING HIGH DYNAMIC RANGE IMAGE

(71) Applicant: CANON KABUSHIKI KAISHA, Tokyo (JP)

(72) Inventor: Hitoshi Nishitani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/337,862

(22) PCT Filed: Sep. 15, 2017

(86) PCT No.: PCT/JP2017/033601
§ 371 (c)(1),
(2) Date: Mar. 28, 2019

(87) PCT Pub. No.: WO2018/061845
PCT Pub. Date: Apr. 5, 2018

(65) Prior Publication Data
US 2020/0029007 A1    Jan. 23, 2020

(30) Foreign Application Priority Data
Sep. 30, 2016    (JP) .............................. JP2016-193117

(51) Int. Cl.
*H04N 5/235*    (2006.01)
*H04N 5/355*    (2011.01)

(52) U.S. Cl.
CPC ......... *H04N 5/2355* (2013.01); *H04N 5/2352* (2013.01); *H04N 5/35572* (2013.01)

(58) Field of Classification Search
CPC ............. H04N 5/2355; H04N 5/35572; H04N 5/2352; H04N 5/2356; G06T 2207/20208; G06T 2207/10144
(Continued)

(56) References Cited

U.S. PATENT DOCUMENTS

2012/0002089 A1* 1/2012 Wang ................ H01L 27/14609
                                                              348/297
2012/0257079 A1* 10/2012 Ninan .................... H04N 5/222
                                                              348/222.1
(Continued)

FOREIGN PATENT DOCUMENTS

| CN | 101510945 A | 8/2009 |
|---|---|---|
| CN | 104702838 A | 6/2015 |

(Continued)

*Primary Examiner* — Lin Ye
*Assistant Examiner* — Chan T Nguyen
(74) *Attorney, Agent, or Firm* — Canon U.S.A., Inc. IP Division

(57) ABSTRACT

An imaging apparatus capable of capturing two images which may not be obtained by the general HDR imaging by simultaneously capturing two images of different exposures by changing exposure change rates of a low exposure image and a high exposure image is provided. The imaging apparatus includes a calculation unit configured to calculate a first exposure for obtaining a first image included in the plurality of images under a first condition and calculate a second exposure for obtaining a second image included in the plurality of images under a second condition which is different from the first condition, and a setting unit configured to set an exposure for obtaining the first and second images based on the first and second exposures calculated by the calculation unit.

16 Claims, 13 Drawing Sheets

(58) Field of Classification Search
USPC .......................................................... 348/362
See application file for complete search history.

(56) References Cited

U.S. PATENT DOCUMENTS

| | | |
|---|---|---|
| 2014/0253792 A1 | 9/2014 | Watanabe |
| 2015/0042848 A1 | 2/2015 | Furukawa |
| 2015/0244916 A1* | 8/2015 | Kang .................. H04N 5/2355 |
| | | 348/222.1 |
| 2016/0093659 A1* | 3/2016 | Nakamura .......... H01L 27/1461 |
| | | 250/208.1 |
| 2016/0191896 A1 | 6/2016 | Basche |
| 2016/0227091 A1 | 8/2016 | Miura |
| 2017/0118424 A1* | 4/2017 | Lule .................. H01L 27/14645 |

FOREIGN PATENT DOCUMENTS

| | | |
|---|---|---|
| JP | 2006333229 A | 12/2006 |
| JP | 2013058922 A | 3/2013 |
| JP | 2013197612 A | 9/2013 |
| JP | 2014-48459 A | 3/2014 |

* cited by examiner

[Fig. 1A]
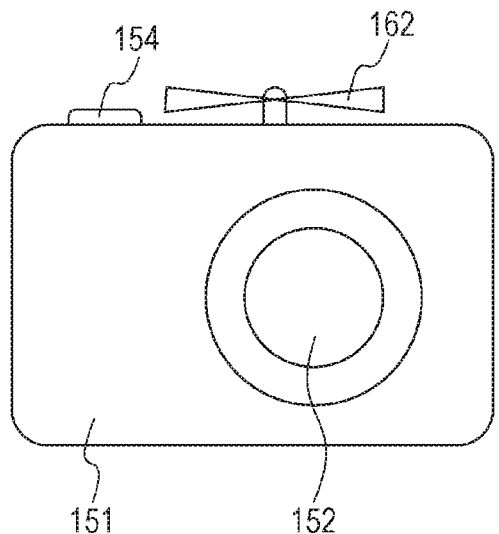
[Fig. 1B]
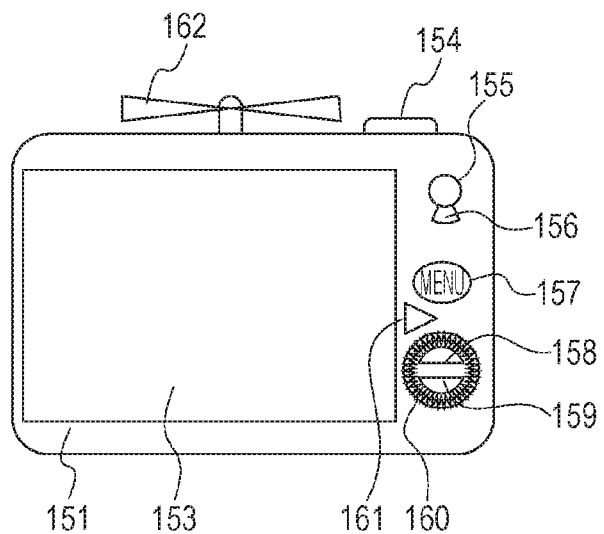

[Fig. 2]
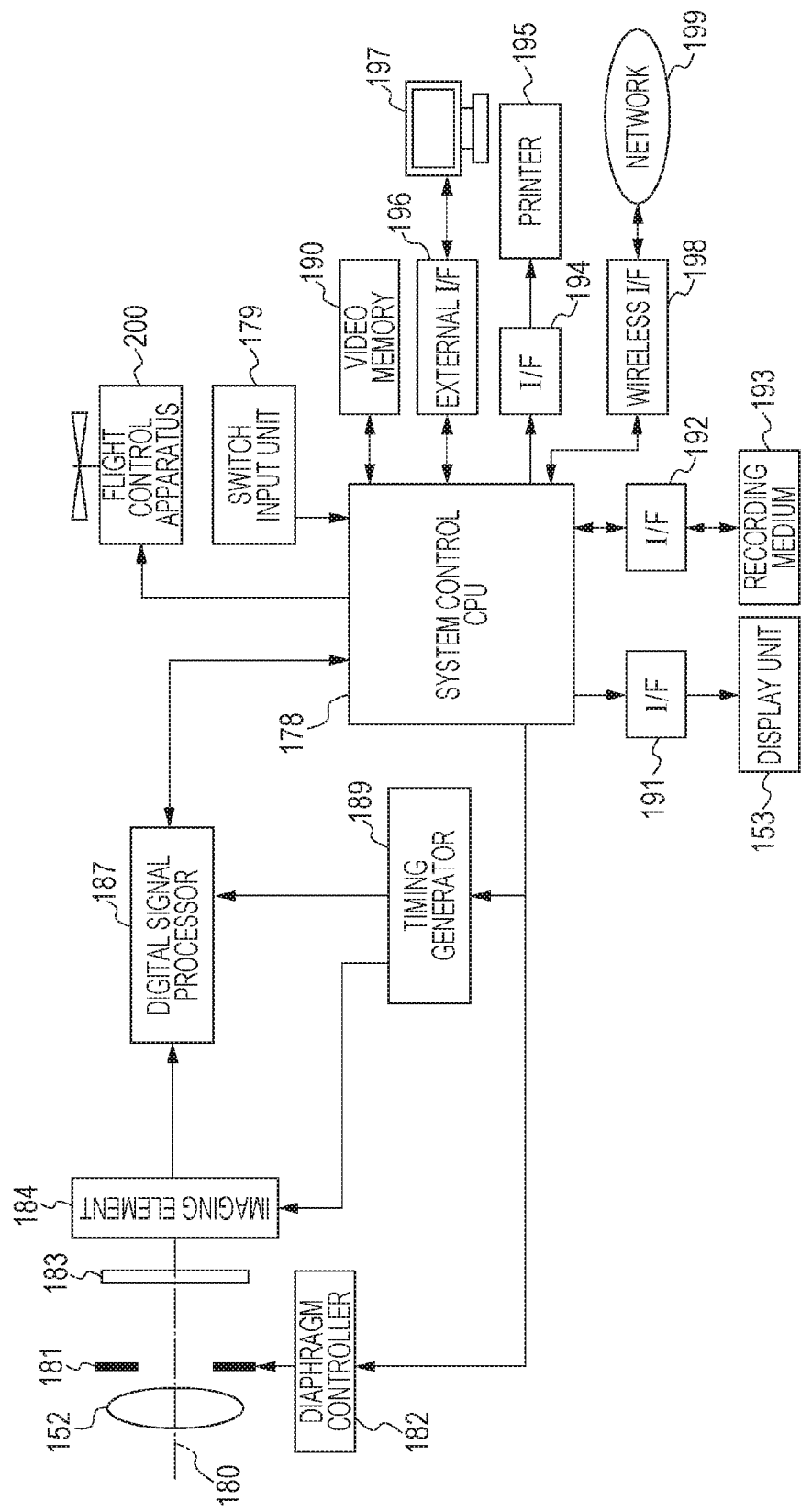

[Fig. 3]
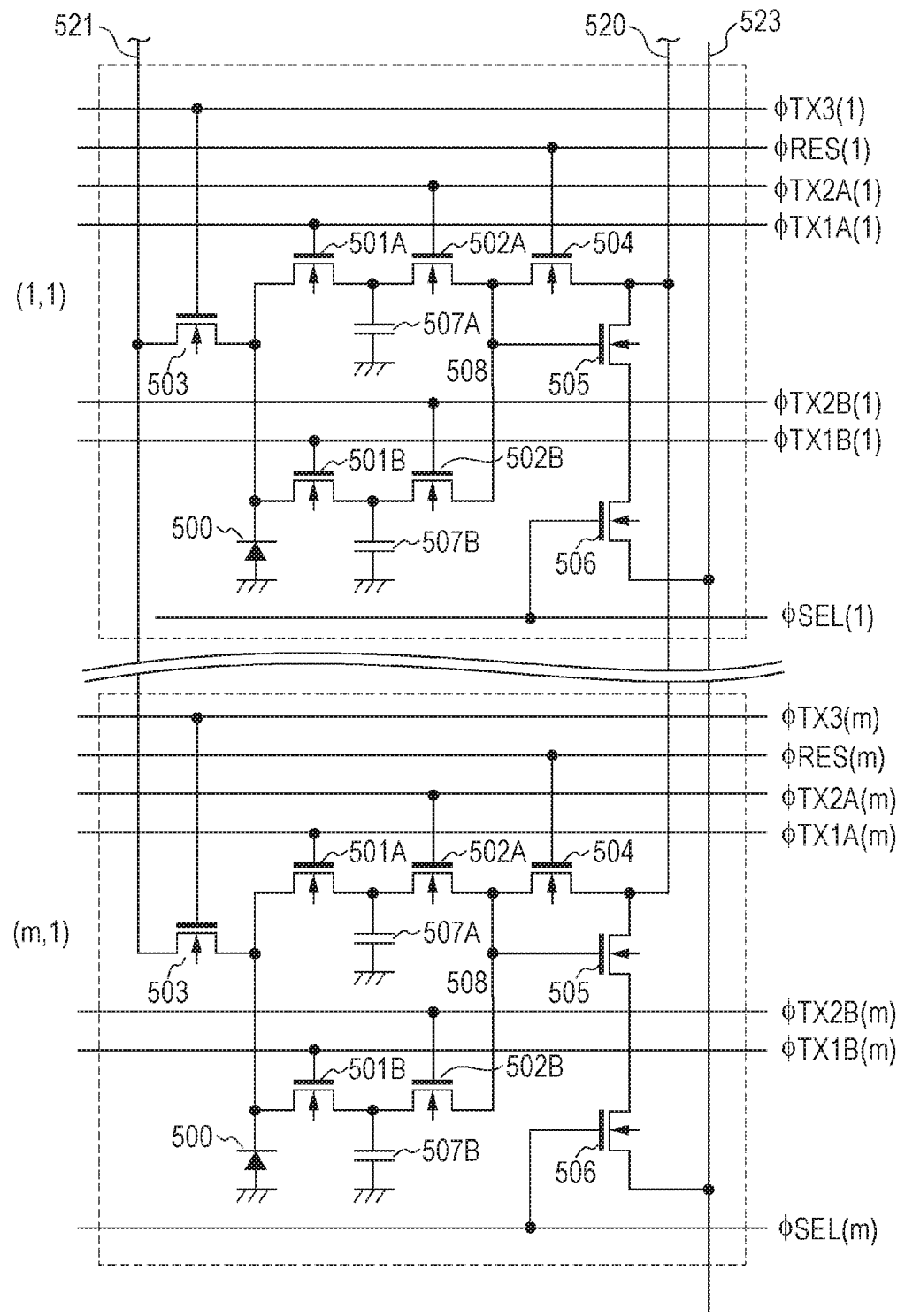

[Fig. 4]
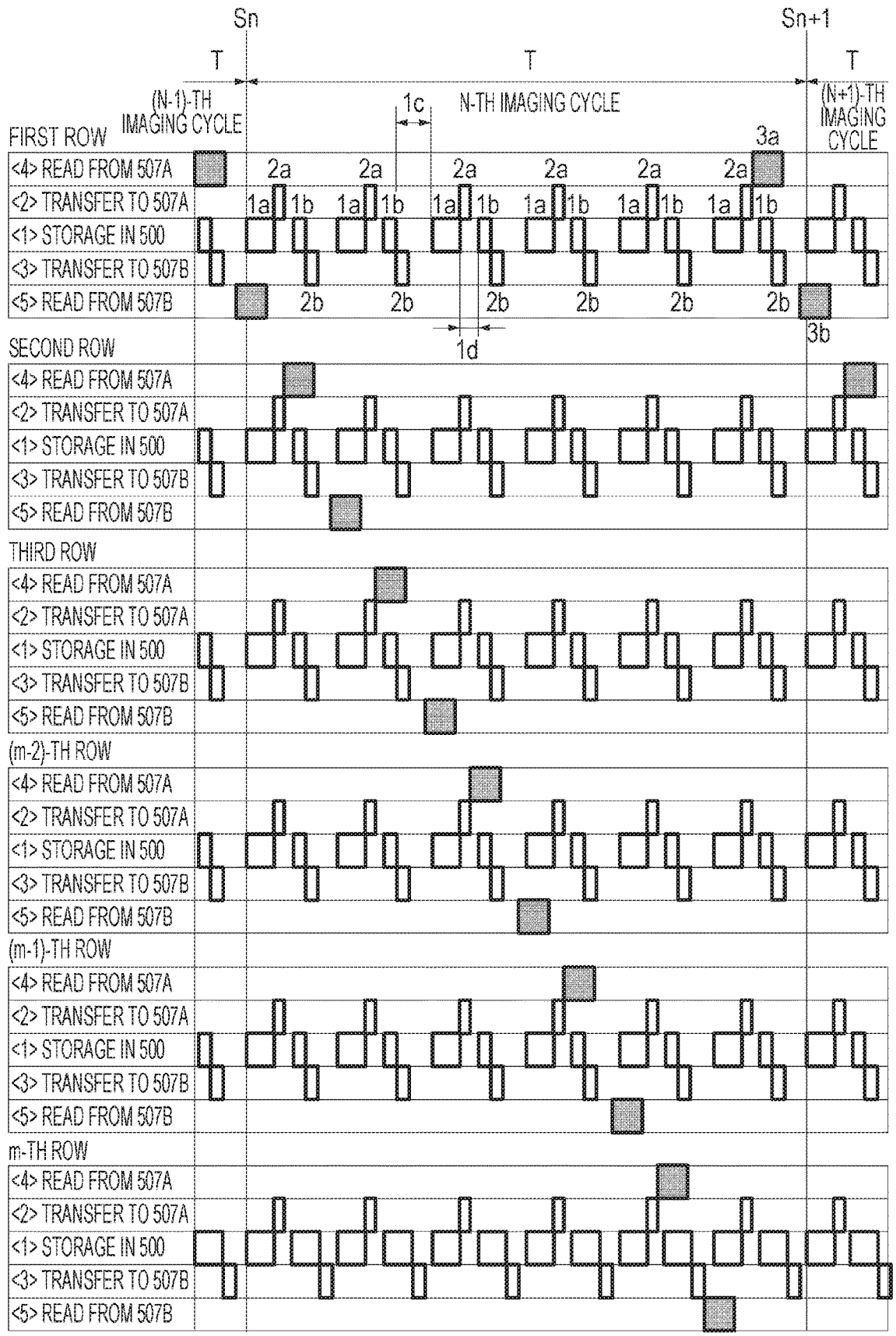

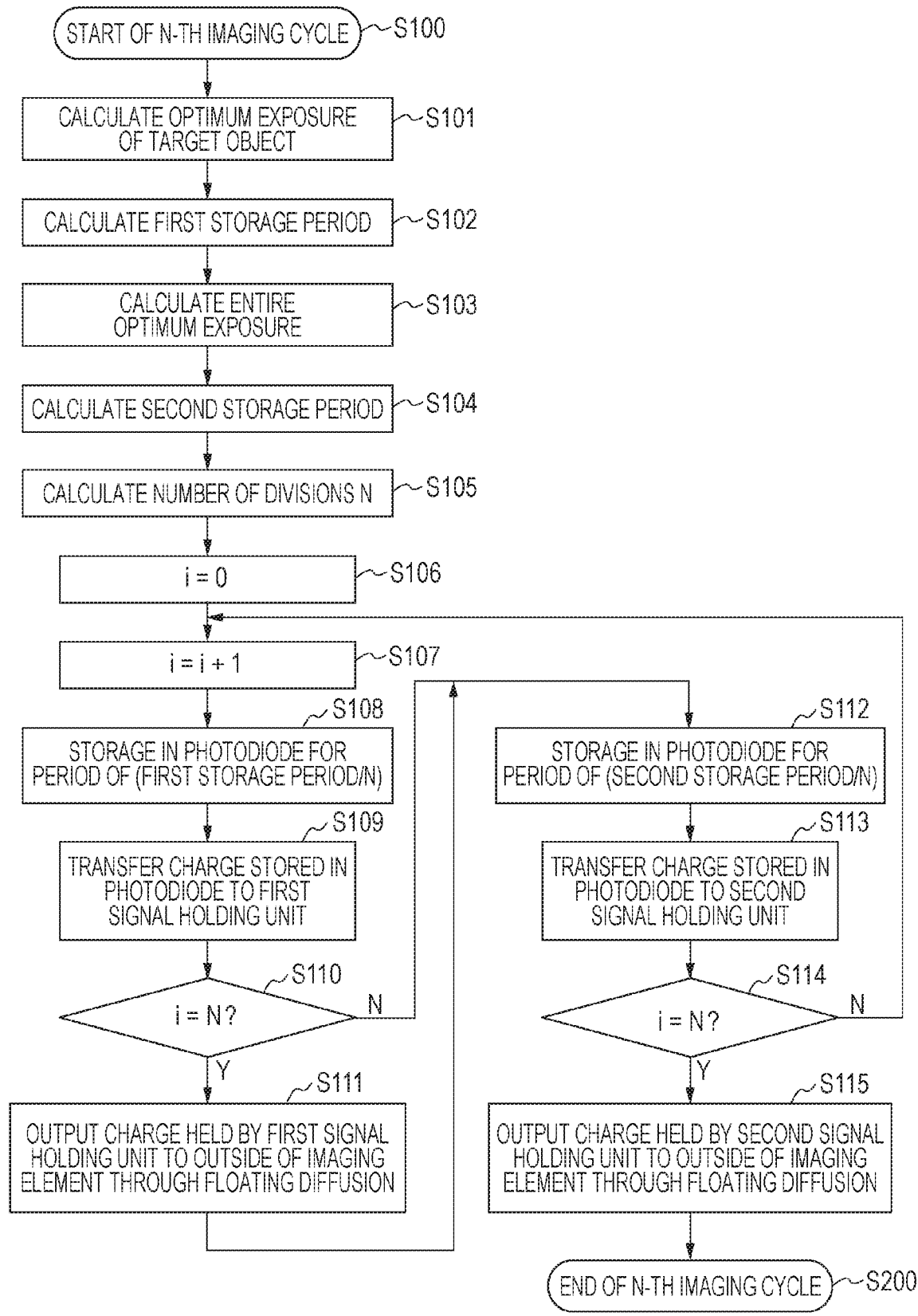
[Fig. 5]

[Fig. 6A]
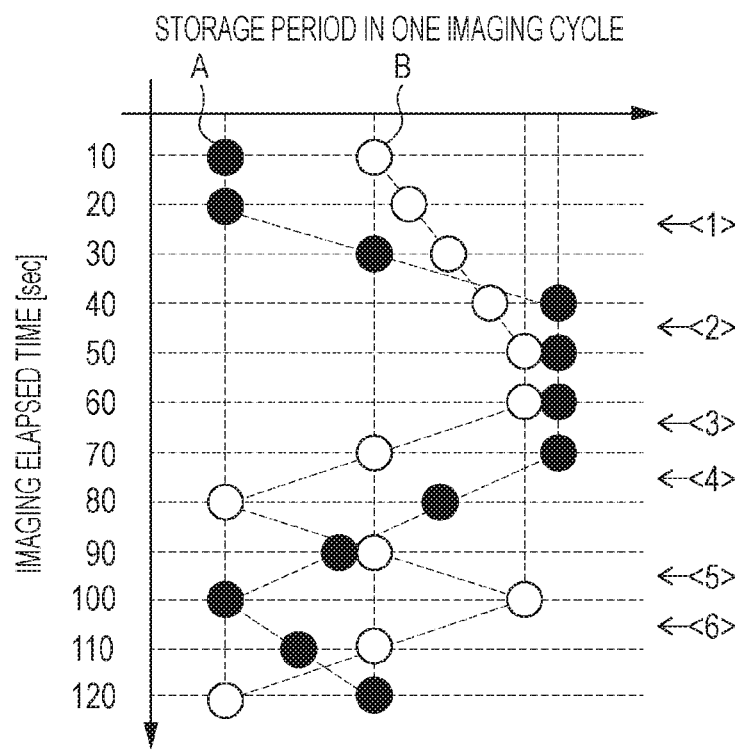
[Fig. 6B]
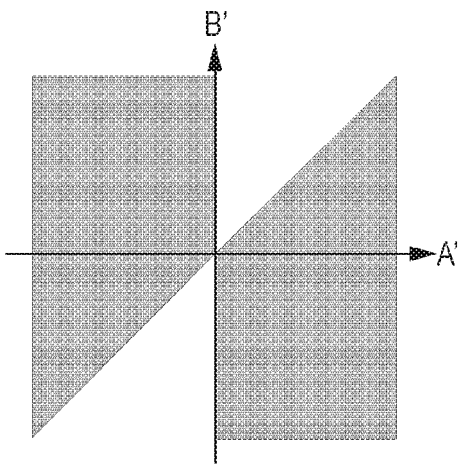

[Fig. 7]
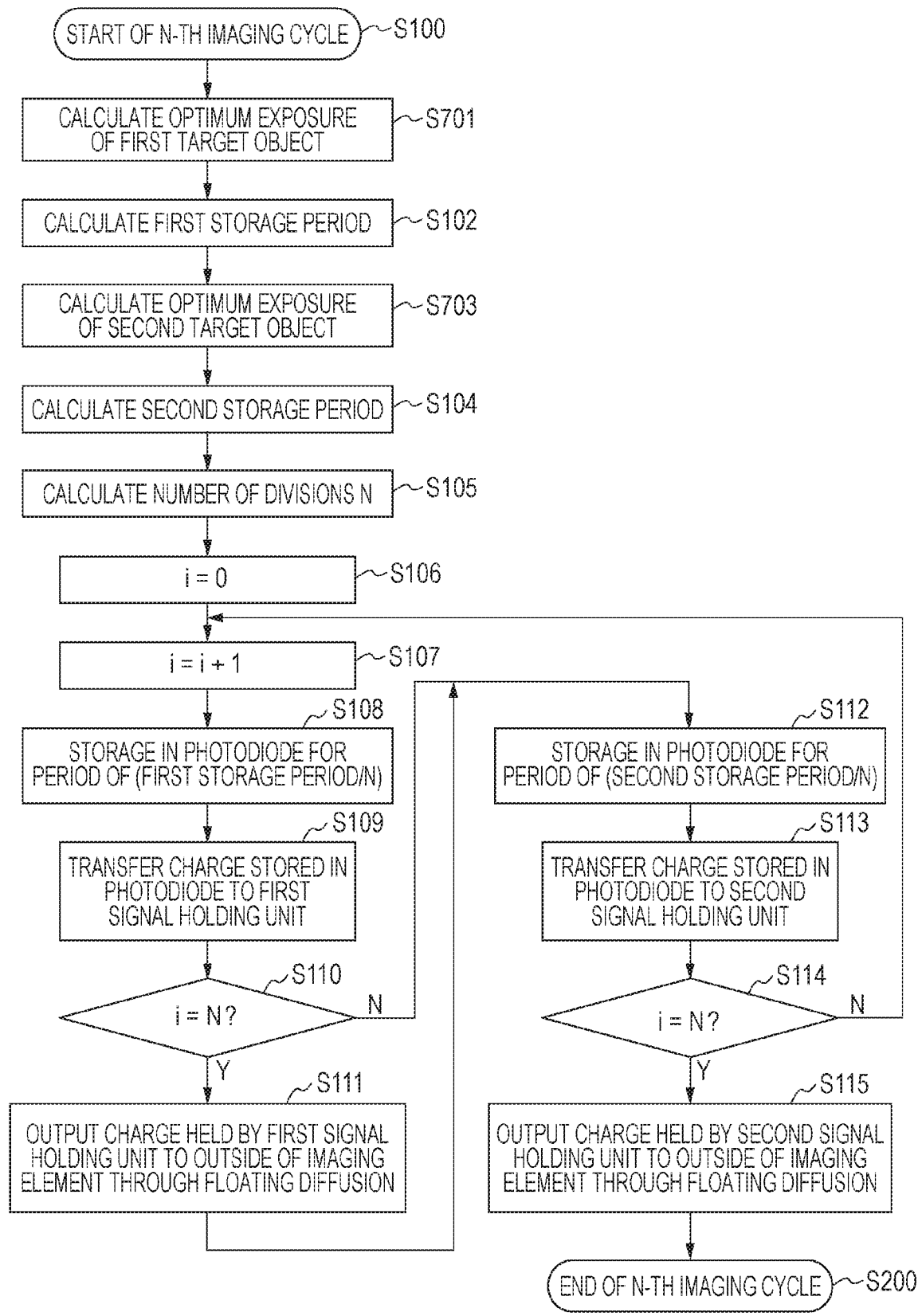

[Fig. 8A]
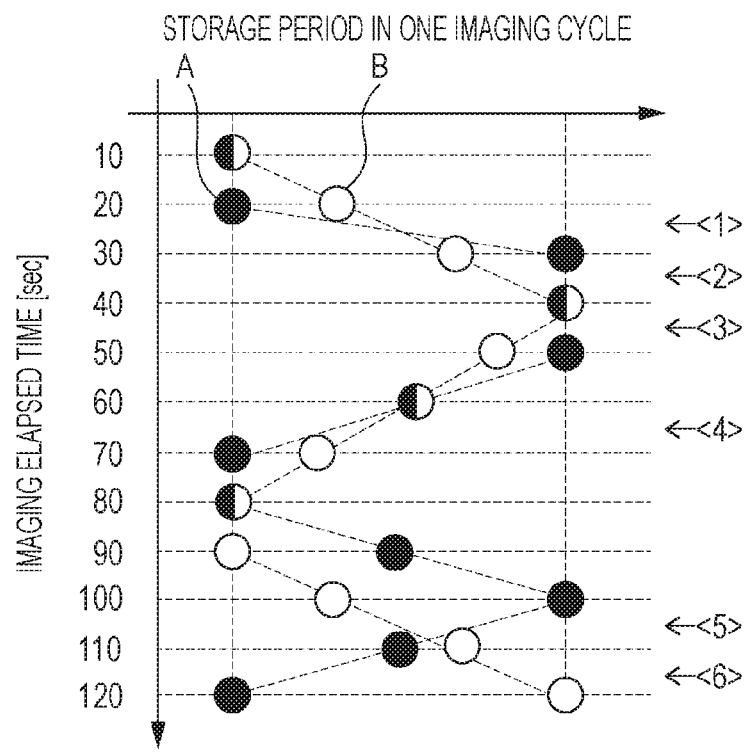
[Fig. 8B]
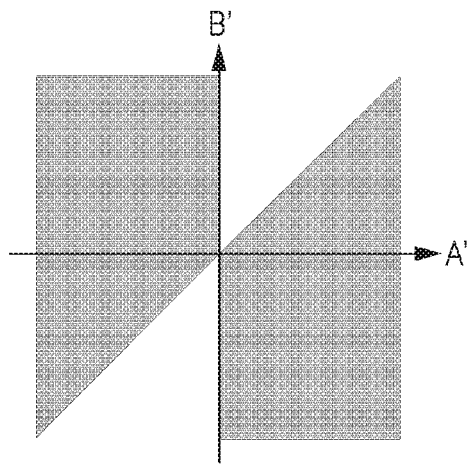

[Fig. 9]
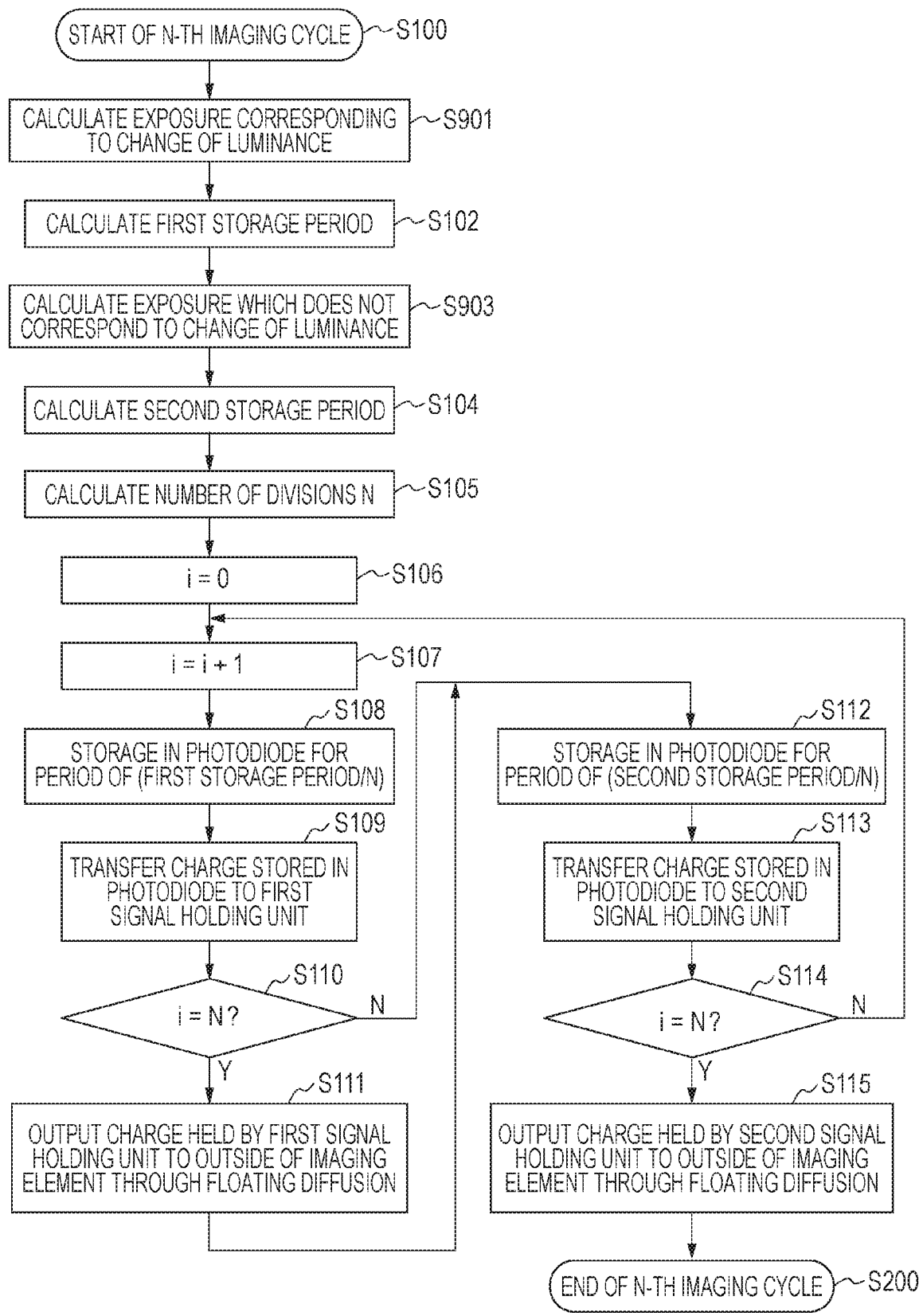

[Fig. 10A]
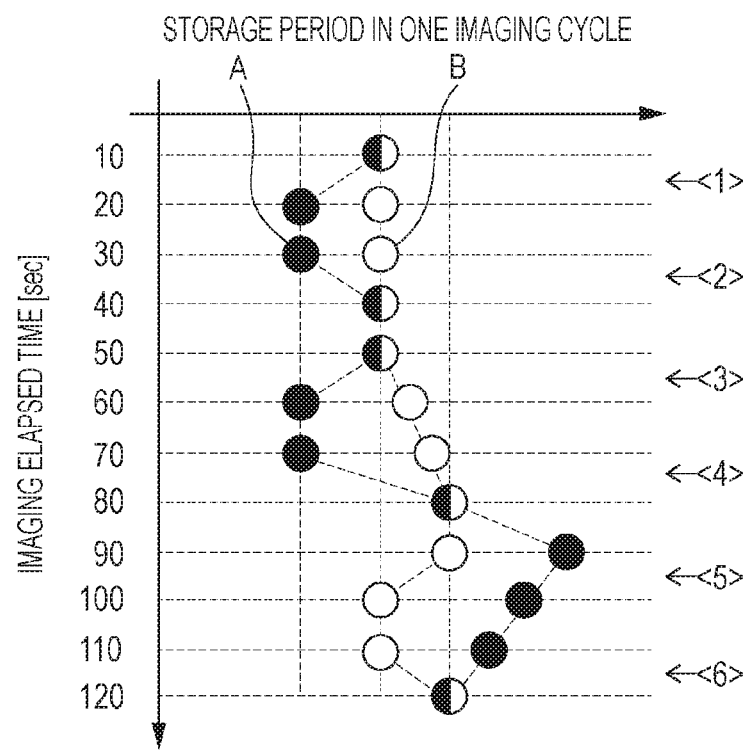
[Fig. 10B]
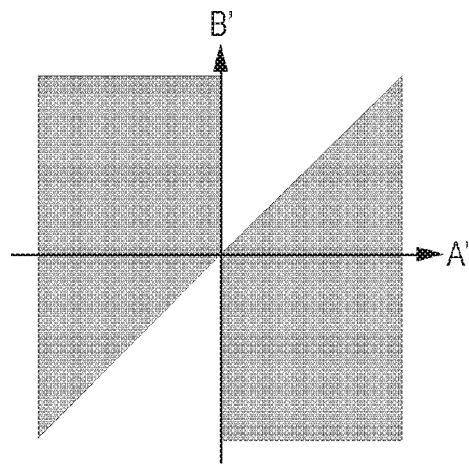

[Fig. 11]
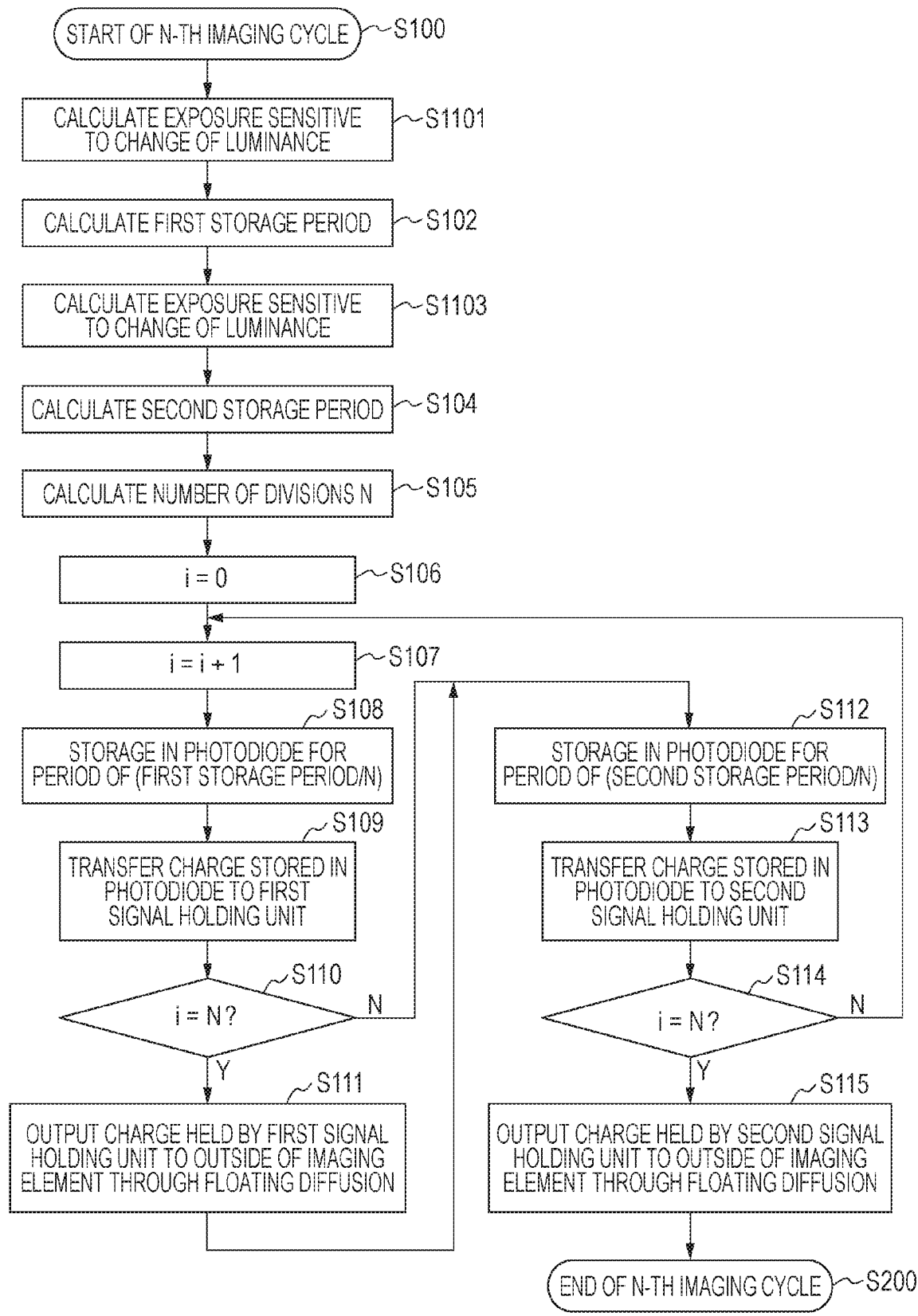

[Fig. 12A]
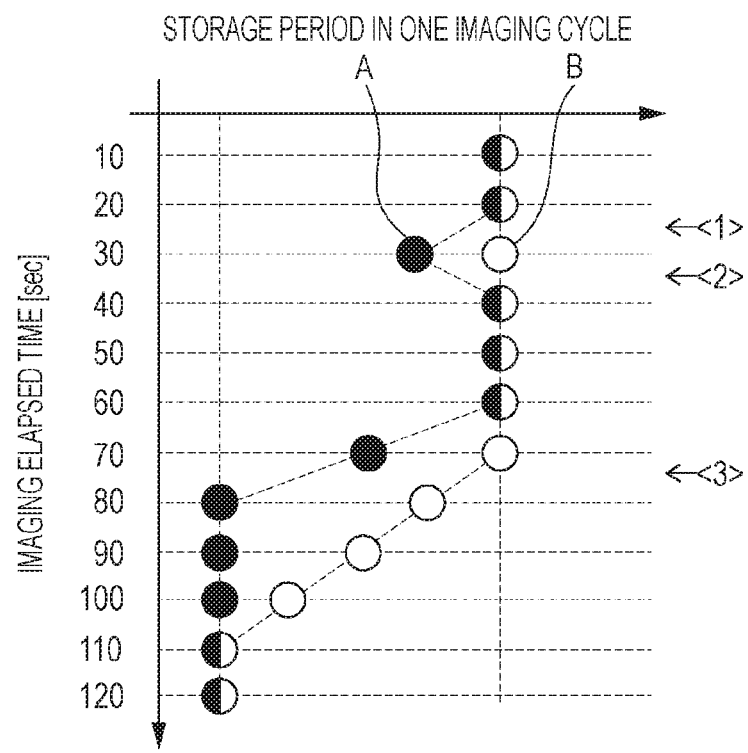
[Fig. 12B]
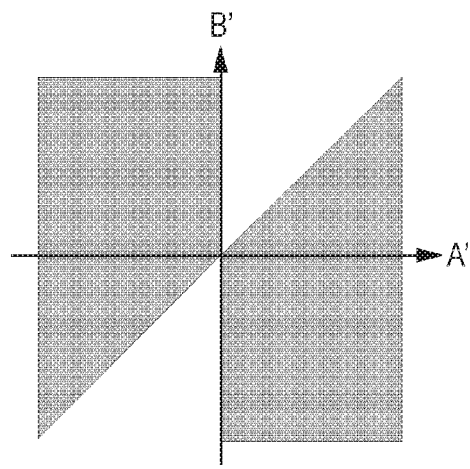

[Fig. 13]
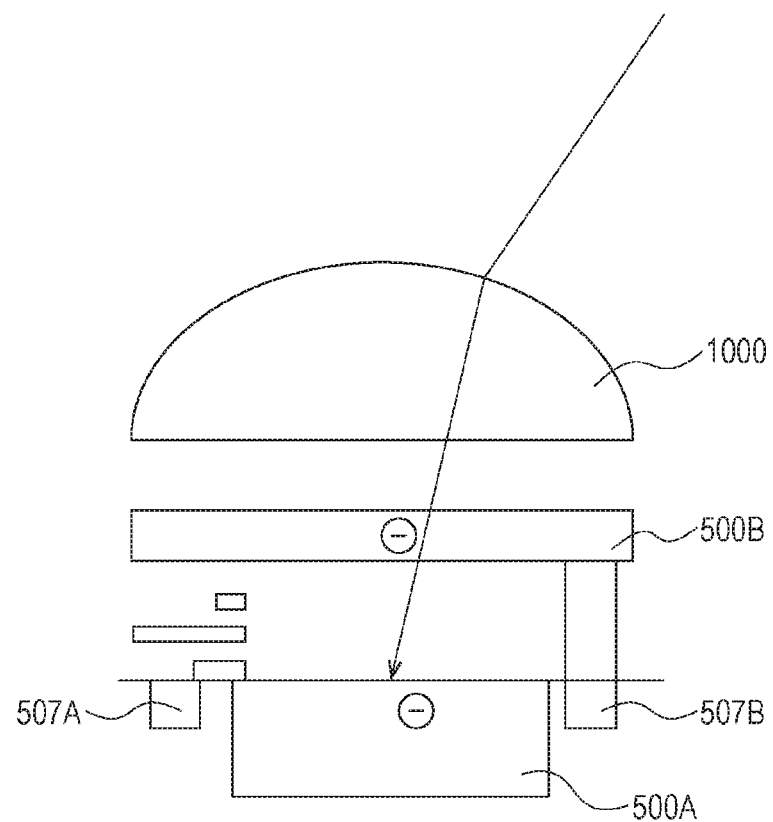

IMAGING APPARATUS AND IMAGING METHOD USING FIRST AND SECOND IMAGES FOR GENERATING HIGH DYNAMIC RANGE IMAGE

TECHNICAL FIELD

The present invention relates to imaging apparatuses and particularly relates to an imaging apparatus including an imaging element which outputs different images corresponding to different storage periods.

BACKGROUND ART

As an application use of combining two images of different exposure degrees, a technique of attaining more realistic feeling when movies or television programs are watched has been proposed. Examples of the technique include a high dynamic range imaging technique (hereinafter referred to as "HDR imaging") for moving images. This technique realizes more realistic sensation than general techniques by mainly expressing instantaneous luminance or partial luminance by enlarging a luminance reproducing range on a display screen. To enhance the realistic sensation in such a technique, a dynamic range of an imaging apparatus which obtains video images is required to be enlarged. PTL 1 discloses a technique of obtaining two images corresponding to different storage periods and enlarging a dynamic range by combining the images.

CITATION LIST

Patent Literature

PTL 1: Japanese Patent Laid-Open No. 2014-48459

SUMMARY OF INVENTION

Solution to Problem

According to an embodiment of the present invention, an imaging apparatus includes a calculation unit configured to calculate a first exposure for obtaining a first image included in the plurality of images under a first condition and calculate a second exposure for obtaining a second image included in the plurality of images under a second condition which is different from the first condition, and a setting unit configured to set an exposure for obtaining the first and second images based on the first and second exposures calculated by the calculation unit.

Further features of the present invention will become apparent from the following description of exemplary embodiments with reference to the attached drawings.

BRIEF DESCRIPTION OF DRAWINGS

FIG. 1A is a diagram illustrating appearance of an imaging apparatus according to a first embodiment of the present invention.

FIG. 1B is a diagram illustrating the appearance of the imaging apparatus according to the first embodiment of the present invention.

FIG. 2 is a diagram illustrating a configuration of the imaging apparatus according to the first embodiment of the present invention.

FIG. 3 is a circuit diagram illustrating an imaging element of the imaging apparatus according to the first embodiment of the present invention.

FIG. 4 is a timing diagram of the imaging element of the imaging apparatus according to the first embodiment of the present invention.

FIG. 5 is a flowchart of a process of the imaging apparatus according to the first embodiment of the present invention.

FIG. 6A is a diagram illustrating changes of the storage periods of the imaging apparatus according to the first embodiment of the present invention.

FIG. 6B is a diagram illustrating the changes of the storage periods of the imaging apparatus according to the first embodiment of the present invention.

FIG. 7 is a flowchart of an imaging apparatus according to a second embodiment of the present invention, FIG. 8A is a diagram illustrating changes of the storage periods of the imaging apparatus according to the second embodiment of the present invention.

FIG. 8B is a diagram illustrating the changes of the storage periods of the imaging apparatus according to the second embodiment of the present invention.

FIG. 9 is a flowchart of an imaging apparatus according to a third embodiment of the present invention.

FIG. 10A is a diagram illustrating changes of storage periods of the imaging apparatus according to the third embodiment of the present invention.

FIG. 10B is a diagram illustrating the changes of the storage periods of the imaging apparatus according to the third embodiment of the present invention.

FIG. 11 is a flowchart of an imaging apparatus according to a fourth embodiment of the present invention.

FIG. 12A is a diagram illustrating changes of storage periods of the imaging apparatus according to the fourth embodiment of the present invention.

FIG. 12B is a diagram illustrating the changes of the storage periods of the imaging apparatus according to the fourth embodiment of the present invention.

FIG. 13 is a cross-sectional view of a pixel element in a modification of the imaging element of the present invention.

DESCRIPTION OF EMBODIMENTS

First Embodiment

A configuration of an imaging apparatus according to a first embodiment of the present invention will be described hereinafter.

FIGS. 1A and 1B are diagrams illustrating appearance of a digital still motion camera corresponding to the imaging apparatus according to the first embodiment of the present invention. FIG. 1A is a front view of the imaging apparatus, and FIG. 1B is a back view of the imaging apparatus. In FIGS. 1A and 1B, the same components are denoted by the same reference numerals.

In FIGS. 1A and 1B, a body 151 of the imaging apparatus accommodates an imaging element and a shutter apparatus. An imaging optical system 152 includes a diaphragm, an image stabilization mechanism, a zoom mechanism, and a focus control mechanism. A movable display unit 153 displays imaging information and videos. A switch ST 154 is mainly used to instruct imaging of a still image. A switch MV 155 is a button used to start and stop shooting of a moving image. The display unit 153 which is a liquid crystal display or an electroluminescence (EL) display has such a display luminance range that even a video having an enlarged dynamic range may be displayed without suppressing the luminance range. Furthermore, die display unit 153 is supported by a support mechanism, not illustrated, such that a display plane is operated in vertical and horizontal directions. An imaging mode selection lever 156 is used to select an imaging mode. Note that examples of the imaging mode include a mode for a high-definition moving image, such as 4K/8K, or a mode for a high frame rate, such as 120 fps/240 fps. A menu button 157 is used to enter a function setting mode for performing various settings on the imaging apparatus. An up switch 158 and a down switch 159 are used to change various setting values, and a dial 160 is also used to change the various setting values. A reproduction button 161 is used to enter a reproduction mode for reproducing a video recorded in a recording medium accommodated in the imaging apparatus body on the display unit 153. Note that, not only images recorded in the recording medium included in the imaging apparatus body, but also images on a network obtained through a wireless communication unit may be displayed on the display unit 153. A propeller 162 is used to float the imaging apparatus in the air so that imaging is performed from the air. Note that configurations of the imaging apparatus of this embodiment are not limited to these. For example, the display unit 153 may include an input device, such as a touch panel. Furthermore, the display unit 153 may include a recording reproduction function of audio where appropriate.

FIG. 2 is a block diagram schematically illustrating a configuration of the imaging apparatus according to the first embodiment of the present invention. In FIG. 2, an imaging element 184 converts an optical image of a subject generated by collecting light through the imaging optical system 152 into an electric video signal. The imaging optical system 152 which forms an optical image of a subject on the imaging element 184 includes a plurality of optical elements (lenses, filters, and the like). An optical axis 180 is for the imaging optical system 152. A diaphragm 181 controls an amount of light which passes the imaging optical system 152 and is controlled by a diaphragm controller 182. An optical filter 183 restricts a wavelength of light which is incident on the imaging element 184 and a space frequency transmitted to the imaging element 184. The imaging element 184 has a number of pixels, a signal reading speed, a color gamut, and a dynamic range which are sufficient for satisfy a standard of Ultra High Definition Television.

A digital signal processor 187 compresses digital video data output from the imaging element 184 after performing various correction processes on the video data. A timing generator 189 outputs various timing signals to the imaging element 184 and the digital signal processor 187. A system control CPU 178 controls various calculations and the entire digital still motion camera. The system control CPU 178 integrally controls various components and sets various parameters so as to control the entire digital still motion camera. Furthermore, the system control CPU 178 includes a memory in which data is electrically written or deleted and executes a program recorded in the memory. Note that the memory is used as an area which stores programs to be executed by the system control CPU 178 and a work area, a data storage area, and the like during the execution of the programs. Note that, the timing generator 189 and the system control CPU 178 correspond to a controller in this embodiment.

A video memory 190 temporarily records video data. A display interface unit 191 is used to display a captured video, and the display unit 153 is constituted by a liquid crystal display, for example. A recording medium 193, such as a semiconductor memory, which is detachable, records video data, additional data, and the like. A recording interface unit 192 is used to perform recording or reading on the recording medium 193.

An external interface unit 196 is used to communicate with an external computer 197. A printer 195 is a small inkjet printer or the like. A print interface unit 194 is used to output a captured video to the printer 195 and print the video. A computer network 199 is the Internet, for example. A wireless interface unit 198 is used to communicate with the computer network 199. A switch input unit 179 includes a plurality of switches, such as the switch ST 154 and the switch MV 155, which perform switching between various modes. A flight controller 200 controls the propeller 162 used to perform imaging from the air.

The imaging element 184 which is part of the imaging apparatus of the present invention is a CMOS type. FIG. 3 is a portion of a circuit diagram of the imaging element 184. The imaging element 184 includes a large number of pixel elements arranged in a matrix. In FIG. 3, in the matrix including a large number of pixel elements, a pixel element in a first row in a first column (1, 1) and a pixel element in an m-th row which is a last row in a first column (m, 1) are illustrated. Configurations of the pixel elements in the first row in the first column (1, 1) and the m-th row in the first column (m, 1) are the same as each other, and therefore, the same components are denoted by the same numbers. Note that a photoelectric conversion unit of the imaging element of this embodiment is not limited to a general CMOS photodiode, and a photo-electric conversion film may be used or a combination of a photoelectric conversion film and a photodiode may be used.

Each of the pixel elements arranged in a matrix in the imaging element 184 of the present invention includes two signal holding units 507A and 507B for one photodiode 500.

In the circuit diagram of FIG. 3, each of the pixel elements includes the photodiode 500, a first transfer transistor 501A, the first signal holding unit 507A, and a second transfer transistor 502A. Each of the pixel elements further includes a third transfer transistor 501B, the second signal holding unit 507B, and a fourth transfer transistor 502B. Each of the pixel elements further includes a fifth transfer transistor 503, a floating diffusion region 508, a reset transistor 504, an amplification transistor 505, and a selection transistor 506.

The first transfer transistor 501A is controlled by a transfer pulse $\Phi TX1A$, and the second transfer transistor 502A is controlled by a transfer pulse $\Phi TX2A$. The third transfer transistor 501B is controlled by a transfer pulse $\Phi TX1B$, and the fourth transfer transistor 502B is controlled by a transfer pulse $\Phi TX2B$. Furthermore, the reset transistor 504 is controlled by a reset pulse $\Phi RES$, and the selection transistor 506 is controlled by a selection pulse $\Phi SEL$. The fifth transfer transistor 503 is controlled by a transfer pulse $\Phi TX3$. The control pulses are supplied from a vertical scanning circuit, not illustrated. Furthermore, a certain fixed voltage is applied to power supply lines 520 and 521. A signal output line 523 is used to output signals to a horizontal circuit, not illustrated, based on charge generated in the photodiode 500. Note that the transfer transistors correspond to a transfer unit which transfers charge generated in the photodiode 500 in this embodiment.

As described above, in the imaging element 184 included in the imaging apparatus of the present invention, pixel elements, each of which includes the photodiode 500 serving as a photoelectric conversion unit and the first and second signal holding units 507A and 507B, are arranged in a matrix. Furthermore, during a first storage period in an imaging cycle controlled based on a control signal supplied from the timing generator 189, a signal charge generated in the photodiode 500 serving as the photo-electric conversion unit is transferred to the first signal holding unit 507A so that a first image is generated. Furthermore, during a second storage period in the same imaging cycle, a signal charge generated in the photodiode 500 serving as the photoelectric conversion unit is transferred to the second signal holding unit 507B so that a second image is generated. Specifically, the imaging element 184 of this embodiment may set the first and second storage periods within one imaging cycle and may read two images, that is, first and second images. Accordingly, a plurality of images including the same subject may be obtained in each imaging cycle. Furthermore, charge not to be used for imaging in the signal charge generated in the photodiode 500 may be transferred to the power supply line 521 through the fifth transfer transistor 503 but not be transferred to the first signal holding unit 507A or the second signal holding unit 507B.

FIG. 4 is a timing chart illustrating timings of storage, transfer, and reading performed by the imaging element 184 when the imaging apparatus of the present invention simultaneously capture two images. Here, the term "storage" indicates generation of charge in the photodiode 500 based on light which passes the imaging optical system 152. Furthermore, the term "transfer" indicates transfer of charge generated in the photodiode 500 to the signal holding units 507A and 507B by controlling the transfer transistors. Moreover, the term "reading" indicates output of charge held by the first and second signal holding units 507A and 507B to an outside of the imaging element 184 through the floating diffusion region 508.

In FIG. 4, an axis of abscissae denotes an elapsed time, and "T" denotes an imaging cycle. In a case of imaging in a frame rate of 60 fps, for example, T is 1/60 seconds. In FIG. 4, a time slot including an end of an (N−1)-th imaging cycle, an entire N-th imaging cycle, and a beginning of an (N+1)-th imaging cycle is illustrated. Furthermore, although timings for six rows are illustrated in FIG. 4 for descriptive purpose, the imaging element 184 has several thousand rows in practice and a last row is denoted by "m" in this embodiment. Furthermore, although one imaging cycle is divided into 12 portions and period of times for six portions are assigned to storage and transfer of first and second images, for example, the division and the assignment are appropriately changed depending on a storage period which is changed depending on an imaging condition. The storage periods and the number of divisions will be described in detail hereinafter.

In synchronization with a vertical synchronization signal Sn at a beginning of the N-th imaging cycle, charge is stored in the photodiode 500 in a period 1a in <1>, and after the storage for a predetermined period of time is terminated, the stored charge is transferred to the signal holding unit 507A in a period 2a in <2>. Thereafter, charge is stored in the photodiode 500 in a period 1b in <1>, and after the storage for a predetermined period of time is terminated, the stored charge is transferred to the signal holding unit 507B in a period 2b in <3>. This operation is repeatedly performed a predetermined number of times (six times in this embodiment). Every time the transfer transistors are controlled a plurality of number of times, charge is added to the signal holding units 507A and 507B. During the imaging cycle, a charge corresponding to 1a×6 storage periods is stored in the signal holding unit 507A, a charge corresponding to 1b×6 storage periods is stored in the signal holding unit 507B, and a sum of the charges corresponds to a total stored charge in the N-th imaging cycle. Thereafter, in a period 3a in <4> and a period 3b in <5>, the charge held after the transfer to the signal holding units 507A and 507B performed the plurality of times is read out of the imaging element 184 through the floating diffusion region 508. After the reading, the charges held in the signal holding units 507A and 507B are reset where appropriate.

In this operation, the storage and the transfer are similarly performed in a repeated manner in pixel elements in a second row onwards. Immediately after the reading in the first row is terminated, stored charges in the pixel elements in the second row onwards are sequentially read as illustrated in FIG. 4. Here, the charge is stored in the photodiode 500 in a period of time from when the storage time 1a is terminated to when the period 1b is started ("1d" in FIG. 4, for example) and a period of time from when the storage time 1b is terminated to when the period 1a is started ("1c" in FIG. 4, for example). The charge is not used for imaging but is transferred to the power supply line 521 by the fifth transfer transistor 503 and is not transferred or added to the first signal holding unit 507A or the second signal holding unit 507B. Although the storage timings in the individual rows are the same in FIG. 4, the timings may not be the same. The charge may be stored by a rolling shutter method by shifting the storage timings in accordance with reading timings.

The period 1a is longer than the period 1b in FIG. 4, and the two images having the different storage periods may be simultaneously generated by differentiating lengths of the periods 1a and 1b. Furthermore, the storage periods may be controlled by changing the number of times storage is performed in one imaging cycle.

Here, a first storage period which is a storage period for a first pixel element supplied from the signal holding unit 507A (hereinafter simply referred to as a "first storage period") changes in accordance with a preset imaging condition and a change of luminance of an image which is changed during imaging. Furthermore, a second storage period which is a storage period for a second pixel element supplied from the signal holding unit 507B (hereinafter simply referred to as a "second storage period") similarly changes. The first and second storage periods in each imaging cycle are determined by a storage period determination unit included in the system control CPU 178.

In this embodiment, the first storage period is set to be suitable for luminance of a portion of a target subject (a face of a person, for example) and the second storage period is set to be suitable for luminance of an entire image. As described above, the first and second storage periods in each imaging cycle are determined by the storage period determination unit. Furthermore, the system control CPU 178 determines the number of times each of the storage periods is divided taking the first and second storage periods and the transfer periods into consideration.

FIG. 5 is a flowchart including processes performed by the system control CPU 178.

In step S100, the system control CPU 178 starts control on the N-th imaging cycle. When processes in steps are performed until step S200, the N-th imaging cycle is terminated. This flow is repeatedly performed on individual pixel elements and further individual imaging cycles so that first and second images are obtained.

In step S101, the system control CPU 178 calculates an exposure setting suitable for a target subject of an image. More specifically, the system control CPU 178 compares luminance in a region (a predetermined range) including the target subject in the image obtained until the (N−1)-th imaging cycle immediately before the N-th imaging cycle with target luminance and calculates an exposure setting which fills a difference between the luminance. Note that, in a case where images including the target subject are consecutively obtained, a rapid change of luminance of the obtained images is determined as an unnatural operation, and therefore, an operation of absorbing the difference from the target luminance is performed in a plurality of imaging cycles. Then the process proceeds to step S102.

In step S102, the system control CPU 178 calculates a first storage period based on the exposure setting calculated in step S101. Then the process proceeds to step S103. Note that the calculation of the storage period is performed based on a program diagram or the like stored in the memory included in the system control CPU 178.

In step S103, the system control CPU 178 calculates an optimum exposure for the entire image. Then the process proceeds to step S104. Also in this case, the system control CPU 178 compares luminance in not only the region including the target subject in the image but also luminance of the entire image with target luminance and calculates an exposure setting which fills a difference between the luminance. Note that the target luminance in this step may not be the same as the target luminance in step S101.

In step S104, the system control CPU 178 calculates a second storage period based on the exposure setting calculated in step S103. Men the process proceeds to step S105.

In step S105, the system control CPU 178 calculates the number of divisions N in each of the storage periods taking the first and second storage periods and the transfer periods into consideration. Then the process proceeds to step S106. Since an imaging cycle is fixed, the longer the storage periods become, the smaller the number of divisions N becomes whereas the shorter the storage periods become, the larger the number of divisions N becomes. Note that the number of divisions N may be determined additionally taking a movement of the subject into consideration. Furthermore, the number of divisions N may be fixed to a predetermined value for simplicity of processing.

In step S106, the system control CPU 178 resets an internal counter i to 0. Then the process proceeds to step S107.

In step S107, the system control CPU 178 increments the counter i. Then the process proceeds to step S108.

In step S108, the system control CPU 178 controls the timing generator 189 so as to store charge in the photodiode 500 for a period of time corresponding to (the first storage period)/N (the period 1a of FIG. 4). Then the process proceeds to step S109.

In step S109, the system control CPU 178 controls the timing generator 189 so as to transfer the charge stored in the photodiode 500 to the signal holding unit 507A. Then the process proceeds to step S110.

In step S110, the system control CPU 178 controls the timing generator 189 so that the storage and the transfer are alternately performed until the counter i reaches N. By this, charge corresponding to the first storage period is stored in the signal holding unit 507A. When the counter i has reached N, the process proceeds to step S111.

In step S111, the system control CPU 178 outputs the charge held by the signal holding units 507A to an outside of the imaging element 184 through the floating diffusion region 508. Then the process proceeds to step S112.

In step S112, the system control CPU 178 controls the timing generator 189 so as to store charge in the photodiode 500 for a period of time corresponding to (the second storage period)/N (the period 1b of FIG. 4). Then the process proceeds to step S113.

In step S113, the system control CPU 178 controls the timing generator 189 so as to transfer the charge stored in the photodiode 500 to the signal holding unit 507B. Then the process proceeds to step S114.

In step S114, the system control CPU 178 controls the timing generator 189 so that the storage and the transfer are alternately performed until the counter i reaches N. By this, charge corresponding to the second storage period is stored in the signal holding unit 507B. When the counter i has reached N, the process proceeds to step S115.

In step S115, the system control CPU 178 outputs the charge held by the signal holding units 507B to the outside of the imaging element 184 through the floating diffusion region 508. Then the process proceeds to step S200.

Note that, although only the control of the storage periods in the photodiode 500 is described in the flowchart of FIG. 5, in addition to this, the diaphragm 181, the imaging element 184, or a gain value of a gain circuit included in the digital signal processor 187 may be additionally controlled. By combining a plurality of methods, a larger dynamic range may be ensured.

Hereinafter, a characteristic of this embodiment relating to change rates of the first and second storage periods determined by the storage period determination unit will be described.

FIG. 6A is a graph of an example of changes of the storage periods in one imaging cycle of the imaging apparatus according to this embodiment. In FIG. 6A, an axis of ordinates denotes an imaging elapsed time while 10 seconds are set to one scale (600 frames in a frame rate of 60 fps), and an axis of abscissae denotes storage periods in individual imaging cycles. Here, only storage periods in each imaging cycle for 10 seconds are plotted for simplicity of display, and plots of the storage periods in imaging cycles within 10 seconds are omitted. However, in the omitted periods, the exposure control is appropriately performed. A plot A indicates the first storage period corresponding to a first image suitable for the target subject, and a plot B indicates the second storage period corresponding to a second image suitable for an entire image. Furthermore, an inclination of a dotted line formed by connecting the plots A or the plots B indicates a storage period change rate. Hereinafter, a change rate of a shorter one of the first and second storage periods in a certain imaging period is determined as a short storage period change rate, and a change rate of a longer one is determined as a long storage period change rate.

In FIG. 6A, in a time slot <1>, the entire image is dark, and therefore, both of the first and second storage periods A and B become long. However, a portion of the target subject becomes further dark, and therefore, the first storage period A which is shorter dramatically increases when compared with the second storage period B which is longer. Specifically, the short storage period change rate is lamer than 0 and the short storage period change rate is larger than the long storage period change rate.

Conversely, in a time slot <4>, the short storage period change rate is smaller than 0 and the short storage period change rate is smaller than the long storage period change rate. Therefore, the first storage period A is longer than the second storage period B.

Furthermore, in a time slot <2>, although the entire image becomes dark, luminance of a portion of the target subject does not change, and therefore, the first storage period A which is suitable for the target subject and which is longer barely changes and only the second storage period B which is suitable for the entire image and which is shorter gradually increases. Specifically, the short storage period change rate is larger than 0 and the short storage period change rate is larger than the long storage period change rate which is 0. Conversely, in a time slot <3>, the short storage period change rate is smaller than 0 and the short storage period change rate is smaller than the long storage period change rate which is 0.

In a time slot <6>, although the entire image becomes bright, a portion of the target subject becomes dark, and therefore, the first storage period A which is associated with the target subject and which is shorter increases and the second storage period B which is associated with the entire image and which is longer reduces. Specifically, the short storage period change rate is larger than 0 and the short storage period change rate is larger than the long storage period change rate. Conversely, in a time slot <5>, the short storage period change rate is smaller than 0 and the short storage period change rate is smaller than the long storage period change rate.

As described above, according to the time slots <1>to <6>, in the imaging apparatus of this embodiment, when the short storage period change rate is larger than 0, the short storage period change rate is larger than the long storage period change rate, whereas when the short storage period change rate is smaller than 0, the short storage period change rate is smaller than the long storage period change rate. Therefore, the storage period determination unit may determine the first and second storage periods for each imaging cycle. FIG. 6B is a diagram illustrating this relationship, and an axis of abscissae denotes a change rate A' of the short storage period A and an axis of ordinates denotes a change rate B' of the long storage period B. Ranges in gray indicate a range of the short storage period change rate A' and a range of the long storage period change rate B' which may not be set by the general imaging apparatuses having a constant change rate but may be set by the imaging apparatus of this embodiment. The imaging apparatus of this embodiment may set ranges of the short storage period change rate A' and the long storage period change rate B' which are set by the general imaging apparatuses, and therefore, the short storage period change rate A' and the long storage period change rate B' may be arbitrarily set.

As described above, according to this embodiment, the first storage period is determined so as to suitable for the target subject, and the second storage period is determined so as to be suitable for the entire image. Consequently, two images in which the magnitude relationship between storage period change rates of a short storage period image and a long storage period image may be reversed may be simultaneously captured. In general, when the luminance of the target subject changes, an image mainly including the target subject changes. Therefore, a change of the luminance of the target subject may be discontinuous when a moving image is generated by combining the short storage period image and the long storage period image with each other. On the other hand, the imaging apparatus of the present invention may capture two images which may not be obtained by the general HDR imaging, that is, two images including an image corresponding to an exposure setting suitable for the target subject and an image corresponding to an exposure setting suitable for the entire image. By using the two images in an independent manner or a combining manner depending on a purpose, an image which May not be generated in the past may be generated. Specifically, since the image mainly including the target subject does not change, it is expected that a continuous and smooth luminance change of the combined image may be attained.

Note that, in this embodiment, luminance of an image is fixed by changing the storage periods in accordance with a change of luminance so that an image suitable for the target subject and an image suitable for the entire image are obtained. However, the same effect may be attained also when different exposure control processes are performed on the target subject and the entire image.

Note that, according to this embodiment, the first storage period is set so as to be suitable for the target subject, and the second storage period is set so as to be suitable for the entire image. However, the same effect may be attained if the storage period determination unit refers to an image range corresponding to a portion of the image when determining the first storage period and refers to an image range corresponding to the entire image when determining the second storage period. Examples of this case include a case where the first storage period is suitable for a right half of the image and the second storage period is suitable for the entire image.

Second Embodiment

Hereinafter, a configuration of an imaging apparatus according to a second embodiment of the present invention will be described only in portions different from the imaging apparatus according to the first embodiment.

In this embodiment, a first storage period is set to be suitable for luminance of a portion corresponding to a first subject (a person A, for example, and the portion is referred to as a "person A" hereinafter) and a second storage period is set to be suitable for luminance of a portion corresponding to a second subject (a person B, for example, and the portion is referred to as a "person B" hereinafter). Note that a subject portion corresponds to a person in this embodiment, the present invention is not limited to this. For example, a subject which is selectable by a user using a switch input unit 179 and which is included in a range selected by a user may be a target. In this embodiment, the switch input unit 179 corresponds to a selection unit to be used by the user to select a certain range in an image.

FIG. 7 is a flowchart of control of the imaging apparatus according to this embodiment. The flowchart is different from that of the first embodiment in step S101 and step S103 which correspond to step S701 and step S703, respectively. In the flowchart, calculations of exposure suitable for the persons A and B are individually performed.

FIG. 8A, which is similar to FIG. 6A, is a graph of an example of changes of storage periods in one imaging cycle of the imaging apparatus according to this embodiment. Note that a plot having a black left portion and a white right portion indicates that a plot A and a plot B overlap with each other. The plot A indicates a first storage period corresponding to a first image suitable for the person A, and the plot B indicates a second storage period corresponding to a second image suitable for the person B. Furthermore, an inclination of a dotted line formed by connecting the plots A or the plots B indicates a storage period change rate. Hereinafter, a change rate of a shorter one of the first and second storage periods in the imaging period is determined as a short storage period change rate, and a change rate of a longer one is determined as a long storage period change rate.

In an imaging elapsed time, the person A reciprocates twice in a bright place and a dark place and the person B reciprocates 1.5 times in a bright place and a dark place, that is, a moving speed of the person A is higher than that of the person B.

In FIG. 8A, in a time slot <1>, the persons A and B move from a bright place to a dark place at a high speed and a low speed, respectively, and therefore, a first storage period A, which is shorter, suitable for the person A considerably increases when compared with a second storage period, which is longer, suitable for the person B. Specifically, the short storage period change rate is larger than 0 and the short storage period change rate is larger than the long storage period change rate. Conversely, in a time slot <4>, the short storage period change rate is smaller than 0, and the short storage period change rate is smaller than the long storage period change rate.

In a time slot <2>, although the person A does not move, the person B moves from a bright place to a dark place. Therefore, the first storage period A, which is longer, suitable for the person A does not change, but only the second storage period B, which is shorter, suitable for the person B increases. Specifically, the short storage period change rate is larger than 0 and the short storage period change rate is larger than the long storage period change rate which is 0. Conversely, in a time slot <3>, the short storage period change rate is smaller than 0 and the short storage period change rate is smaller than the long storage period change rate which is 0.

In a time slot <5>, the person A moves from the dark place to the bright place and the person B moves from the dark place to the bright place. Therefore, the second storage period A, which is shorter, suitable for the person B increases and the first storage period A, which is longer, suitable for the person A reduces. That is, the short storage period change rate is larger than 0 and the short storage period change rate is larger than the long storage period change rate. Conversely, in a time slot <6>, the short storage period change rate is smaller than 0, and the short storage period change rate is smaller than the long storage period change rate.

As described above, according to the time slots <1> to <6>, in the imaging apparatus of this embodiment, when the short storage period change rate is larger than 0, the short storage period change rate is larger than the long storage period change rate, and when the short storage period change rate is smaller than 0, the short storage period change rate is smaller than the long storage period change rate. Therefore, a storage period determination unit may determine the first and second storage periods for each imaging cycle. FIG. 8B is a diagram illustrating this relationship, and an axis of abscissae denotes a change rate A' of the short storage period. A and an axis of ordinates denotes a change rate B' of the long storage period B. Ranges in gray indicate the short storage period change rate A' and the long storage period change rate B' which may not be set by the general imaging apparatuses having a constant change rate but may be set by the imaging apparatus of this embodiment. The imaging apparatus of this embodiment may set the ranges of the short storage period change rate A' and the long storage period change rate B' which may be set by the general imaging apparatuses, and therefore, the short storage period change rate A' and the long storage period change rate B' may be arbitrarily set.

As described above, according to this embodiment, the first storage period is set so as to be suitable for the first target subject, and the second storage period is set so as to be suitable for the second target subject. Consequently, two images in which the magnitude relationship between storage period change rates of a short storage period image and a long storage period image may be reversed may be simultaneously captured. Therefore, the imaging apparatus of the present invention may capture two images which may not be obtained by the general HDR imaging, that is, two images including an image corresponding to an exposure setting suitable for the first target subject and an image corresponding to an exposure setting suitable for the second target subject. By using the two images in an independent manner or a combining manner depending on a purpose, an image which may not be generated in the past may be generated.

Note that, although luminance of the images are fixed by changing the storage periods in association with luminance so as to obtain images suitable for the target subjects in this embodiment, the same effect may be attained when different exposure control processes suitable for the different target subjects are performed.

Note that, according to this embodiment, the first storage period is set so as to be suitable for the first target subject, and the second storage period is set so as to be suitable for the second target subject. However, an image range which is referenced by the storage period determination unit when the first storage period is determined is a first portion of an image and an image range which is referenced by the storage period determination unit when the second storage period is determined is a second portion. Accordingly, if the first and second portions are different ranges, the same effect may be attained. Examples of this case include a case where the first storage period is suitable for a right half of an image and the second storage period is suitable for a left half of the image.

Third Embodiment

Hereinafter, a configuration of an imaging apparatus according to a third embodiment of the present invention will be described only in portions different from the imaging apparatus according to the first embodiment.

In this embodiment, a storage period determination unit determines first and second storage periods such that different responses are obtained in accordance with a change of luminance of an image. As an example, a first storage period is changed in association with a change of luminance of the image whereas a second storage period is not changed in association with the change of the luminance of the image.

Here, when the storage period is changed in association with the change of luminance, a white spot caused by overexposure or a black spot caused by under-exposure is merely generated, and accordingly, an image having a comparatively high contrast may be obtained. If the contrast of the image is high, accuracy of autofocus or image blurring correction may be improved when sharpness of the image, which is detected, is used for the autofocus or when a motion vector, which is detected, is used for the image ring correction. On the other hand, if a storage period is not changed in association with the change of the luminance, overexposure or underexposure occurs in the image in accordance with the change of the luminance. Therefore, a captured image desired by a user may be effectively obtained by manually setting exposure or an image having luminance which is almost the same as actual visual luminance may be effectively obtained by automatically setting exposure. In this embodiment, the user may determine a manual exposure setting using the switch input unit 179 or the like. Specifically, the switch input unit 179 corresponds to a determination unit used by the user to determine an exposure setting. Note that examples of an image blur include a subject blur caused when the subject moves and a blur caused when the entire imaging apparatus moves.

FIG. 9 is a flowchart of control of the imaging apparatus according to this embodiment. The flowchart is different from that of the first embodiment in step S101 and step S103 which correspond to step S901 and step S903, respectively.

FIG. 10A, which is similar to FIG. 6A, is a graph of an example of changes of storage periods in one imaging cycle of the imaging apparatus according to this embodiment. Note that a plot having a black left portion and a white right portion indicates that a plot A and a plot B overlap with each other. The plot A indicates the first storage period corresponding to a first image changed in association with a change of luminance of the image, and a plot B indicates the second storage period corresponding to a second image which is not changed in association with the luminance of the image. Furthermore, an inclination of a dotted line formed by connecting the plots A or the plots B indicates a storage period change rate. Hereinafter, a change rate of a shorter one of the first and second storage periods in an imaging period is determined as a short storage period change rate, and a change rate of a longer one is determined as a long storage period change rate.

In this imaging elapsed time, the luminance of the image becomes bright in a range from 20 to 30 seconds and a range from 60 to 70 seconds, becomes dark at 90 seconds, and thereafter, gradually becomes bright. Therefore, to suppress generation of black spots or white spots and obtain an image of high contrast, the storage period A becomes short in the range from 20 to 30 seconds and the range from 60 seconds to 70 seconds, becomes long at 90 seconds, and thereafter, gradually becomes short. On the other hand, the storage period B is not changed in association with a change of luminance caused by a user's intension or an automatic exposure setting, gradually becomes long in a range from 50 to 80 seconds, and obtains a slight overexposure, and becomes short in a range from 100 to 110 seconds so that the exposure is returned.

In FIG. 10A, in a time slot <4>, the first storage period which changes in association with a change of luminance of the image is more considerably increased when compared with the second storage period B which does not change in association with the change of the luminance of the image. That is, the short storage period change rate is larger than 0 and the short storage period change rate is larger than the long storage period change rate. Conversely, in a time slot <5>, the short storage period change rate is smaller than 0, and the short storage period change rate is smaller than the long storage period change rate.

In a time slot <2>, although the first storage period A which changes in association with a change of the luminance of the image increases, the second storage period B which does not change in association with the change of the luminance of the image does not change. Specifically, the short storage period change rate is larger than 0 and the short storage period change rate is larger than the long storage period change rate which is 0. Conversely, in a time slot <1>, the short storage period change rate is smaller than 0 and the short storage period change rate is smaller than the long storage period change rate which is 0.

In a time slot <6>, the first storage period A which changes in association with a change of the luminance of the image reduces, and the second storage period B which does not change in association with the change of the luminance of the image increases. That is, the short storage period change rate is larger than 0 and the short storage period change rate is larger than the long storage period change rate. Conversely, in a time slot <3>, the short storage period change rate is smaller than 0, and the short storage period change rate is smaller than the long storage period change rate.

According to the time slots <1> to <6>, in the imaging apparatus of this embodiment, when the short storage period change rate is larger than 0, the short storage period change rate is larger than the long storage period change rate, and when the short storage period change rate is smaller than 0, the short storage period change rate is smaller than the long storage period change rate. Therefore, the storage period determination unit may determine the first and second storage periods for each imaging cycle. FIG. 10B is a diagram illustrating this relationship, and an axis of abscissae denotes a change rate A' of the short storage period A and an axis of ordinates denotes a change rate B' of the long storage period B. Ranges in gray indicate the short storage period change rate A' and the long storage period change rate B' which may not be set by the general imaging apparatuses having a constant change rate but may be set by the imaging apparatus of this embodiment. The imaging apparatus of this embodiment may set the ranges of the short storage period change rate A' and the long storage period change rate B' which may be set by the general imaging apparatuses, and therefore, the short storage period change rate A' and the long storage period change rate B' may be arbitrarily set.

As described above, according to this embodiment, the first storage period is set so as to change in association with a change of luminance of the image, and the second storage period is set so as not to change in association with the change of the luminance of the image. Consequently, two images in which the magnitude relationship between the storage period change rates of the short storage period image and the long storage period image may be reversed may be simultaneously captured. Therefore, the imaging apparatus of the present invention may capture two images which may not be obtained by the general HDR imaging, that is, two images including an image corresponding to an exposure setting which is changed in association with a change of luminance of the image and an image corresponding to an exposure setting which is not changed in association with a change of luminance of the image. By using one of the two images for recording and the other for image processing for improving accuracy of autofocus and image blurring correction or by combining the two images depending on a purpose, an image which May not be generated in the past may be generated. For example, a specific subject (such as a person) may be subjected to manual exposure and other regions are subjected to automatic exposure control.

Note that, according to this embodiment, the first storage period is set so as to change in association with a change of luminance of the image, and the second storage period is set so as not to change in association with the change of the luminance of the image. However, association degrees may be arbitrarily set, and the same effect may be attained as long as the association degrees are different from each other.

Fourth Embodiment

Hereinafter, a configuration of an imaging apparatus according to a fourth embodiment of the present invention will be described only in portions different from the imaging apparatus according to the first embodiment.

In this embodiment, a storage period determination unit determines first and second storage periods such that speeds of responses to a change of luminance of an image are different from each other. As an example, a first storage period sensitively responds to a change of luminance of an entire image whereas a second storage period insensitively responds to the change of the luminance of the entire image. These settings of sensitiveness and insensitiveness may be performed by controlling a P gain or a D gain of so-called PID control.

FIG. 11 is a flowchart of the process. The flowchart is different from that of the first embodiment in step S101 and step S103 which correspond to step S1101 and step S1103, respectively.

FIG. 12A, which is similar to FIG. 6A, is a graph of an example of changes of storage periods in one imaging cycle of the imaging apparatus according to this embodiment. Note that a plot having a black left portion and a white right portion indicates that a plot A and a plot B overlap with each other. The plot A indicates the first storage period which changes sensitively in response to a change of luminance of the image, and a plot B indicates the second storage period which changes insensitively in response to the change of the luminance of the image. Furthermore, an inclination of a dotted line formed by connecting the plots A or the plots B indicates a storage period change rate. Hereinafter, a change rate of a shorter one of the first and second storage periods in an imaging period is determined as a short storage period change rate, and a change rate of a longer one is determined as a long storage period change rate.

In this imaging elapsed time, the entire image temporarily becomes bright at 30 seconds, the brightness immediately returns, and the entire image gradually becomes bright at 70 seconds onwards. Although the first storage period A responds to the change of the luminance at 30 seconds, the second storage period B does not respond. The second storage period B responds to the gradual change of the luminance to a bright state at 70 seconds behind the first storage period A.

In a time slot <3>, the first storage period A which sensitively responds to a change of luminance of the entire image more considerably reduces when compared with the second storage period B which insensitively responds to the change of the luminance of the entire image. That is, the short storage period change rate is smaller than 0 and the short storage period change rate is smaller than the long storage period change rate.

In a time slot <1>, although the first storage period A which sensitively responds to a change of the luminance of the entire image reduces, the second storage period B which insensitively responds to a change of luminance of the entire image does not change. Specifically, the short storage period change rate is smaller than 0 and the short storage period change rate is smaller than the long storage period change rate which is 0. Conversely, in a time slot <2>, the short storage period change rate is larger than 0 and the short storage period change rate is larger than the long storage period change rate which is 0.

According to the time slots <1> to <3>, unlike the general imaging apparatuses, in the imaging apparatus of this embodiment, when the short storage period change rate is larger than 0, the short storage period change rate is larger than the long storage period change rate, whereas when the short storage period change rate is smaller than 0, the short storage period change rate is smaller than the long storage period change rate. Therefore, the storage period determination unit may determine the first and second storage periods for each imaging cycle. FIG. 12B is a diagram illustrating this relationship, and an axis of abscissae denotes a change rate A' of a short storage period A and an axis of ordinates denotes a change rate B' of a long storage period B. Ranges in gray indicate the short storage period change rate A' and the long storage period change rate B' which may not be set by the general imaging apparatuses having a constant change rate but may be set by the imaging apparatus of this embodiment. The imaging apparatus of this embodiment may set the ranges of the short storage period change rate A' and the long storage period change rate B' which are set by the general imaging apparatuses, and therefore, the short storage period change rate A' and the long storage period change rate B' may be arbitrarily set.

As described above, according to this embodiment, the first storage period sensitively responds to a change of luminance of the entire image whereas the second storage period insensitively responds to a change of luminance of the entire image. Consequently, two images in which the magnitude relationship between the storage period change rates of the short storage period image and the long storage period image may be reversed may be simultaneously captured. Therefore, the imaging apparatus of the present invention may capture two images which may not be obtained by the general HDR imaging, that is, two images including an image corresponding to an exposure setting most suitable for the first target subject and an image corresponding to an exposure setting most suitable for the second target subject. By using the two images in an independent manner or a combining manner depending on a purpose, an image which may not be generated in the past may be generated.

Although the operations of the imaging apparatuses according to the first to fourth embodiments of the present invention have been described, instead of the completely independent control of change rates of exposure for obtaining two images without fixing of the change rates, a certain restriction may be set. For example, an upper limit or a lower limit may be provided for a difference between exposures of images. In this case, it is preferable that one of the exposures of the images which is preferentially selected is appropriately determined. For example, it is preferable that one of the exposures which is preferentially calculated is determined taking a main subject, such as a person, into consideration.

Note that transition among the operations in a number of the first to fourth embodiments may be performed. In a case where target subjects, such as a plurality of persons, are detected in the operation of the first embodiment, for example, the operation of the second embodiment may be entered. Furthermore, if a target subject is not detected, amounts of changes of the first and second storage periods may be fixed. In this case, when a subject is detected, one of the operations in the first to fourth embodiments is preferably entered.

Note that, although the two images of different exposures are obtained in the first to fourth embodiments, the present invention is not limited to this. When three or more images are to be obtained, the operations according to the embodiments may be performed on all or a number of the images.

Modification of Imaging Element

The same effect may be attained in an imaging apparatus which includes an imaging element other than the imaging element including the single photodiode 500 and the two first and second signal holding units 507A and 507B in one pixel element as illustrated in FIG. 3.

For example, two photoelectric conversion units 500A and 500B include respective signal holding units 507A and 507B as illustrated in FIG. 13. Although the photo-electric conversion unit 500A is the same as the photodiode 500 of FIG. 3, the photo-electric conversion unit 500B is constituted by a photoelectric conversion film formed of an organic thin film or the like. Since the photoelectric conversion unit 500B is disposed for incident light between the photoelectric conversion unit 500A and a microlens 1000, the same subject is captured by the photoelectric conversion units 500A and 500B. In other words, the same effect may be attained by performing the control according to the first to fourth embodiments in the exposure calculations of the photoelectric conversion units 500A and 500B.

Although the photoelectric conversion units are laminated relative to the incident light in this modification, a plurality of photodiodes may be disposed on one light receiving surface.

Furthermore, the functions of the timing generator 189 and the system control CPU 178 which performs the exposure calculations may be implemented in the imaging element 184. In this case, it is preferable that a chip including the photoelectric conversion units and another signal processing chip are laminated.

Other Embodiments

The present invention may be realized by a process of supplying programs which realize at least one of the functions of the foregoing embodiments to a system or an apparatus through a network or a recording medium and reading and executing the programs using at least one processor in a computer included in the system or the apparatus. Alternatively, the present invention may be realized by a circuit having at least one function (an ASIC, for example).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM) a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-193117, filed Sep. 30, 2016, which is hereby incorporated by reference herein in its entirety.

The invention claimed is:

1. An imaging apparatus including an imaging element which outputs a plurality of images for each imaging cycle, the imaging apparatus comprising at least one processor or circuit configured to perform the operations of the following units:
    a calculation unit configured to calculate a first exposure for obtaining a first image included in the plurality of images under a first condition and calculate a second exposure for obtaining a second image included in the plurality of images under a second condition which is different from the first condition; and
    a setting unit configured to set an exposure for obtaining the first and second images based on the first and second exposures calculated by the calculation unit,
    wherein the first image and the second image are used for generating a high dynamic range image,
    wherein the first exposure and the second exposure are different from each other, and are controllable based on the first condition and the second condition so as to change a difference of exposure between the first exposure and the second exposure,
    wherein the first condition includes luminance of a subject included in a first range in an image,
    wherein the second condition includes luminance of a subject included in a second range in an image,
    wherein the second range includes a range different from the first range, and
    wherein the calculation unit is able to calculate the first exposure and the second exposure based on the first condition and the second condition such that a magnitude relationship between the first exposure and the second exposure are reversed between a first timing and a second timing after the first timing.

2. The imaging apparatus according to claim 1, wherein the calculation unit calculates the first and second exposures using the first and second images obtained in an imaging cycle immediately before a target imaging cycle.

3. The imaging apparatus according to claim 1, wherein the first and second images include the same subject.

4. The imaging apparatus according to claim 1,
    wherein the first and second conditions include luminance of a subject included in predetermined ranges in an image, and
    the range used for the calculation of the first exposure is smaller than the range used for the calculation of the second exposure.

5. The imaging apparatus according to claim 4, further comprising:
    a selection unit configured to select a target subject in subjects included in an image,
    wherein the range used for the calculation of the first exposure includes the target subject selected by the selection unit.

6. The imaging apparatus according to claim 5,
    wherein the selection unit is capable of selecting a plurality of target subjects, and the range used for the calculation of the second exposure include a target subject which is selected by the selection unit and which is different from the target subject included in the range used for the calculation of the first exposure.

7. The imaging apparatus according to claim 1 further comprising:
    a determination unit used by a user to determine the second exposure, wherein the setting unit sets an exposure for obtaining the second image based on the second exposure determined by the determination unit.

8. The imaging apparatus according to claim 1,
wherein the calculation unit calculates the first and second exposures for responses to changes of luminance in the first and second images obtained by an imaging cycle immediately before a target imaging cycle, and
the calculation unit has a response speed for the first exposure and a response speed for the second exposure which are different from each other.

9. The imaging apparatus according to claim 1,
wherein the imaging element includes a plurality of pixel elements arranged in a matrix, each of the pixel elements includes a photoelectric conversion unit which converts incident light into charge, a first transfer unit which transfers the charge generated in the photoelectric conversion unit to a first holding unit, and a second transfer unit which transfers the charge generated in the photoelectric conversion unit to a second holding unit, and
the imaging element outputs a first image based on the charges held in the first holding units in the individual pixel elements for each imaging cycle and outputs a second image based on the charges held by the second holding units in the individual pixel elements.

10. The imaging apparatus according to claim 9, further comprising:
a controller configured to control the first and second transfer units,
wherein the controller controls the first and second transfer unit a plurality of times in the imaging cycle, and transfers the charge generated in the photoelectric conversion unit to the first holding unit or the second holding unit a plurality of times.

11. The imaging apparatus according to claim 1,
wherein the imaging element includes a plurality of pixel elements arranged in a matrix, each of the pixel elements includes two photoelectric conversion units which convert incident light into charge, a first transfer unit which transfers charge generated in one of the two photoelectric conversion units to a first holding unit which holds the charge, and a second transfer unit which transfers charge generated in the other of the two photoelectric conversion units to a second holding unit, and
the imaging element outputs a first image based on the charge held in the first holding units in the individual pixels elements for each imaging cycle and outputs a second image based on the charge held in the second holding units in the individual pixel elements.

12. The imaging apparatus according to claim 11, wherein the two photoelectric conversion units are laminated relative to incident light.

13. The imaging apparatus according to claim 1, further comprising:
an imaging optical system which collects light from the subject to the imaging element,
wherein the calculation unit calculates a gain value of a gain circuit included in the imaging element as an exposure, a storage period, and an aperture value included in the imaging optical system.

14. The imaging apparatus according to claim 1, further comprising a generation unit configured to generate a moving image based on the high dynamic range image obtained by combining the first and second images.

15. A method for controlling an imaging apparatus including an imaging element which outputs a plurality of images for each imaging cycle, the method comprising:
calculating a first exposure for obtaining a first image included in the plurality of images under a first condition and calculating a second exposure for obtaining a second image included in the plurality of images under a second condition which is different from the first condition; and
setting an exposure for obtaining the first and second images based on the calculated first and second exposures,
wherein the first image and the second image are used for generating a high dynamic range image,
wherein the first exposure and the second exposure are different from each other, and are controllable based on the first condition and the second condition so as to change a difference of exposure between the first exposure and the second exposure,
wherein the first condition includes luminance of a subject included in a first range in an image,
wherein the second condition includes luminance of a subject included in a second range in an image,
wherein the second range includes a range different from the first range, and
wherein, in the calculating, the first exposure and the second exposure are able to be calculated based on the first condition and the second condition such that a magnitude relationship between the first exposure and the second exposure are reversed between a first timing and a second timing after the first timing.

16. An imaging element which outputs a plurality of images for each imaging cycle, the imaging element comprising at least one processor or circuit configured to perform the operations of the following units:
a calculation unit configured to calculate a first exposure for obtaining a first image included in the plurality of images under a first condition and calculate a second exposure for obtaining a second image included in the plurality of images under a second condition which is different from the first condition; and
a setting unit configured to set an exposure for obtaining the first and second images based on the first and second exposures calculated by the calculation unit,
wherein the first image and the second image are used for generating a high dynamic range image,
wherein the first exposure and the second exposure are different from each other, and are controllable based on the first condition and the second condition so as to change a difference of exposure between the first exposure and the second exposure,
wherein the first condition includes luminance of a subject included in a first range in an image,
wherein the second condition includes luminance of a subject included in a second range in an image,
wherein the second range includes a range different from the first range, and
wherein the calculation unit is able to calculate the first exposure and the second exposure based on the first condition and the second condition such that a magnitude relationship between the first exposure and the second exposure are reversed between a first timing and a second timing after the first timing.

* * * * *